(12) United States Patent
Hayes et al.

(10) Patent No.: US 10,475,143 B1
(45) Date of Patent: Nov. 12, 2019

(54) SOCIAL JOURNEY

(71) Applicant: Allstate Insurance Company, Northbrook, IL (US)

(72) Inventors: Howard Hayes, Glencoe, IL (US); Moises Norena, Northbrook, IL (US); Robert H. Johnson, Hoffman Estates, IL (US)

(73) Assignee: Allstate Insurance Company, Northbrook, IL (US)

( * ) Notice: Subject to any disclaimer, the term of this patent is extended or adjusted under 35 U.S.C. 154(b) by 20 days.

(21) Appl. No.: 15/483,420

(22) Filed: Apr. 10, 2017

Related U.S. Application Data

(63) Continuation of application No. 14/838,747, filed on Aug. 28, 2015, now Pat. No. 9,651,391.

(60) Provisional application No. 62/043,801, filed on Aug. 29, 2014.

(51) Int. Cl.
*G06Q 50/30* (2012.01)
*G06Q 30/02* (2012.01)
*G01S 19/13* (2010.01)
*G01C 21/34* (2006.01)

(52) U.S. Cl.
CPC ......... *G06Q 50/30* (2013.01); *G01C 21/3438* (2013.01); *G01S 19/13* (2013.01); *G06Q 30/0259* (2013.01); *G06Q 30/0266* (2013.01); *G06Q 2240/00* (2013.01)

(58) Field of Classification Search
CPC .............. G06Q 50/30; G06Q 30/0266; G06Q 30/0259; G06Q 2240/00; G01C 21/3438; G01S 19/13

USPC ....................................................... 701/410
See application file for complete search history.

(56) References Cited

U.S. PATENT DOCUMENTS

| | | | |
|---|---|---|---|
| 2003/0100326 A1 | 5/2003 | Grube et al. | |
| 2008/0046173 A1* | 2/2008 | Lappe | G01C 21/28 701/533 |
| 2010/0280854 A1 | 11/2010 | Huang et al. | |
| 2012/0035848 A1 | 2/2012 | Yonezawa et al. | |
| 2014/0164129 A1 | 6/2014 | Joshi | |
| 2015/0019757 A1* | 1/2015 | Wechsler | G08G 1/0145 709/244 |
| 2015/0095198 A1 | 4/2015 | Eramian | |
| 2015/0254581 A1* | 9/2015 | Brahme | G06Q 10/02 705/5 |

OTHER PUBLICATIONS

Oct. 31, 2016—(US) Final Office Action—U.S. Appl. No. 14/838,747.
Apr. 21, 2016—(US)—NonFinal Office Action—U.S. Appl. No. 14/838,747.
Feb. 1, 2017—(US) Notice of Allowance—U.S. Appl. No. 14/838,747.

* cited by examiner

*Primary Examiner* — Brian P Sweeney
(74) *Attorney, Agent, or Firm* — Banner & Witcoff, Ltd.

(57) ABSTRACT

Methods, computer-readable media, software, and apparatuses provide a system that may facilitate communications between drivers who share a route. The system may allow communications to be sent from one driver to another driver and allow drivers to post queries to other drivers sharing a route. Computing devices in the vehicle may collect route data for the system to evaluate and to use in identifying drivers sharing a route.

6 Claims, 12 Drawing Sheets

SOCIAL JOURNEY

The present application is a continuation patent application of U.S. patent application Ser. No. 14/838,747, filed Aug. 28, 2015 which claims priority to and the benefit of U.S. Provisional Application No. 62/043,801, filed Aug. 29, 2014, the contents of which are hereby incorporated by reference.

BACKGROUND

A driver on a journey from point A to point B is often traveling along the same route as other drivers. Drivers on the route, may desire information, for example, about the route ahead or about traffic or road conditions or tips that other drivers might know. However, there is currently no way for a driver to communicate with others on such a shared route, other than the inefficient waving through a vehicle window as they pass each other. Citizens band radio has been used for communications between drivers in a region, but the communications of citizens band radio are broadcast to anyone listening in the region, including those not on a shared route.

Therefore, improved systems and methods to address these and other shortcomings in the art are desired.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure relate to apparatuses, computer implemented methods and computer readable media for identifying users who a share a route. Drivers often share a route with other drivers, although they may not realize it. They may be going from one particular area to another and may be on the same route or different routes to the same destination. Some drivers may be going from point A to point B while others are going from point B to point A. Each driver may have information, such as information about the route, which may be helpful or useful to another driver.

In accordance with aspects of the disclosure, a system may be provided to connect users for communication or to provide communications among the users sharing a route. The system may provide the users with the ability to query each other or to query others on a route. The system may provide for route sharing and destination recommendations. In some aspects of the disclosure, the system may provide users the ability to request shared rides or other services from other drivers. In some embodiments, the system may recommend routes, destinations or merchants, who may offer coupons or discounts. The system may provide information to one or more users along a route. In some embodiments, the system may incorporate user driver records or intersection or route accident claim history in recommendations or in relation to other services.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Aspects of this disclosure relate to systems and methods that may be utilized to enhance the driving experience by creating a community of drivers (users) who share a route. Aspects of the disclosure involve obtaining user route information and providing services, such as information about a route or destinations along or near the route or communications with other drivers who share the route.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
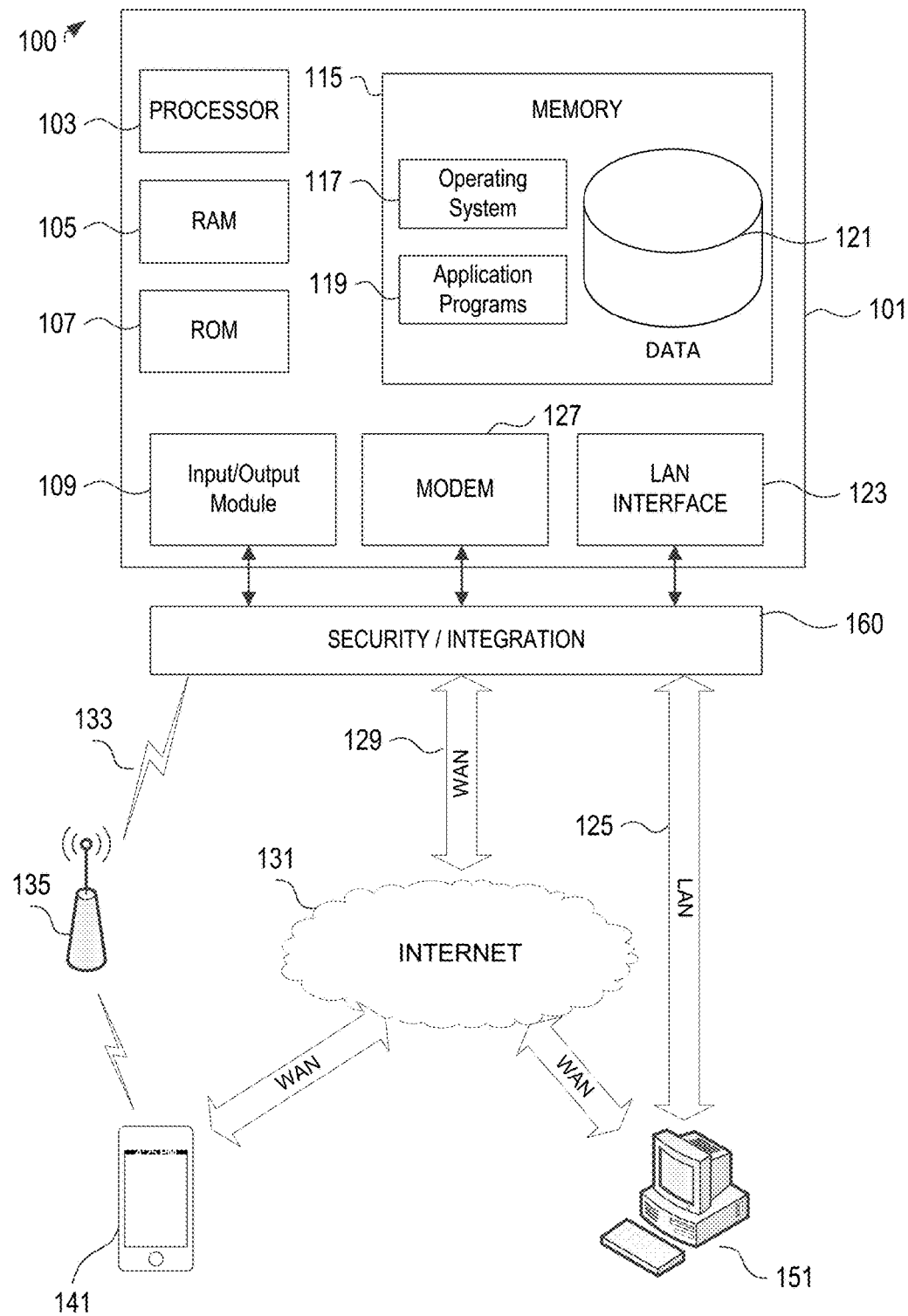
FIG. 1 is a block diagram of an example computing device that may be used according to an illustrative embodiment of the present disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices, such as a life insurance provider device or system, or a customer device or system, configured as described herein for determining users who are on a shared route, and performing various determinations and actions based on the user requests.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. In some examples, one or more nonvolatile hardware memory units having at least 5 gigabytes (GB) of memory may be used in device 101, in order to support sufficient numbers of user records in certain embodiments of social journey providing systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to store and update user routes, retrieve and analyze user insurance data from a clearinghouse, and perform various determinations and actions using the user data, such as processing queries or requests or postings.

The computing device may operate in a networked environment supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a local area network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless network 133.

Also illustrated in FIG. 1 is a security and integration layer 160, through which communications may be sent and managed between the computing device 101 and the remote devices (141 and 151) and remote networks (125, 129, and 133). The security and integration layer 160 may comprise one or more computing devices, such as web servers, authentication servers, and various networking components (e.g., firewalls, routers, gateways, load balancers, etc.), having some or all of the elements described above with respect to the computing device 101. As an example, security and integration layer 160 may comprise a set of web application servers configured to use secure protocols and to insulate the computing device 101 from external devices 141 and 151. In some cases, the security and integration layer 160 may correspond to a set of dedicated hardware and/or software operating at the same physical location and under the control of same entities as the computing device 101. For example, layer 160 may correspond to one or more dedicated web servers and network hardware in a datacenter or in a cloud infrastructure. In other examples, the security and integration layer 160 may correspond to separate hardware and software components which may be operated at a separate physical location and/or by a separate entity.

As discussed below, the data transferred to and from a computing device 101 in a social journey providing system may include secure and sensitive data, such as user location and destination data. Therefore, it may be desirable to protect the data transmission by using secure network protocols and encryption, and also to protect the integrity of the data stored when on the computing device 101 using the security and integration layer 160 to authenticate users and restrict access to unknown or unauthorized users. In various implementations, security and integration layer 160 may provide, for example, a file-based integration scheme or a service-based integration scheme. In filed-based integration, data files may be transmitted to and from the computing device 101 through the security and integration layer 160, using various network communication protocols. Secure data transmission protocols and/or encryption may be used in file transfers to protect to integrity of the user data, for example, File Transfer Protocol (FTP), Secure File Transfer Protocol (SFTP), and/or Pretty Good Privacy (PGP) encryption.

In service-based integration, one or more web services may be implemented within the computer system 100 and/or security and integration layer 160. The web services may be accessed by authorized external devices and users to support input, extraction, and manipulation of the data in the social journey providing computing device 101. Web services built to support the social journey providing service may be cross-domain and/or cross-platform, and may be built for enterprise use. Such web services may be developed in accordance with various web service standards, such as the Web Service Interoperability (WS-I) guidelines. In some examples, a social journey providing web service may be implemented in the security and integration layer 160 using the Secure Sockets Layer (SSL) or Transport Layer Security (TLS) protocol to provide secure connections between the computing device 101 and various clients 141 and 151 attempting to insert or manipulate data within the clearinghouse. SSL or TLS may be used with HTTP or HTTPS to provide authentication and confidentiality. In other examples, a social journey providing web service may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a social journey providing database) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of social journey providing systems, such as faster response times and less dependence on network conditions when accessing the social journey providing system to update or retrieve user route information, or processing requests for user services.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and social journey providing system components described herein may be configured to communicate using any of these network protocols or technologies.

Additionally, one or more application programs 119 may be used by the computing device 101 within a social journey providing system, including computer executable instructions for receiving and processing user route and requested user services, maintaining, retrieving and analyzing user data (e.g., user preferences, interests, etc.), and performing other related functions as described herein.

Figure 2:
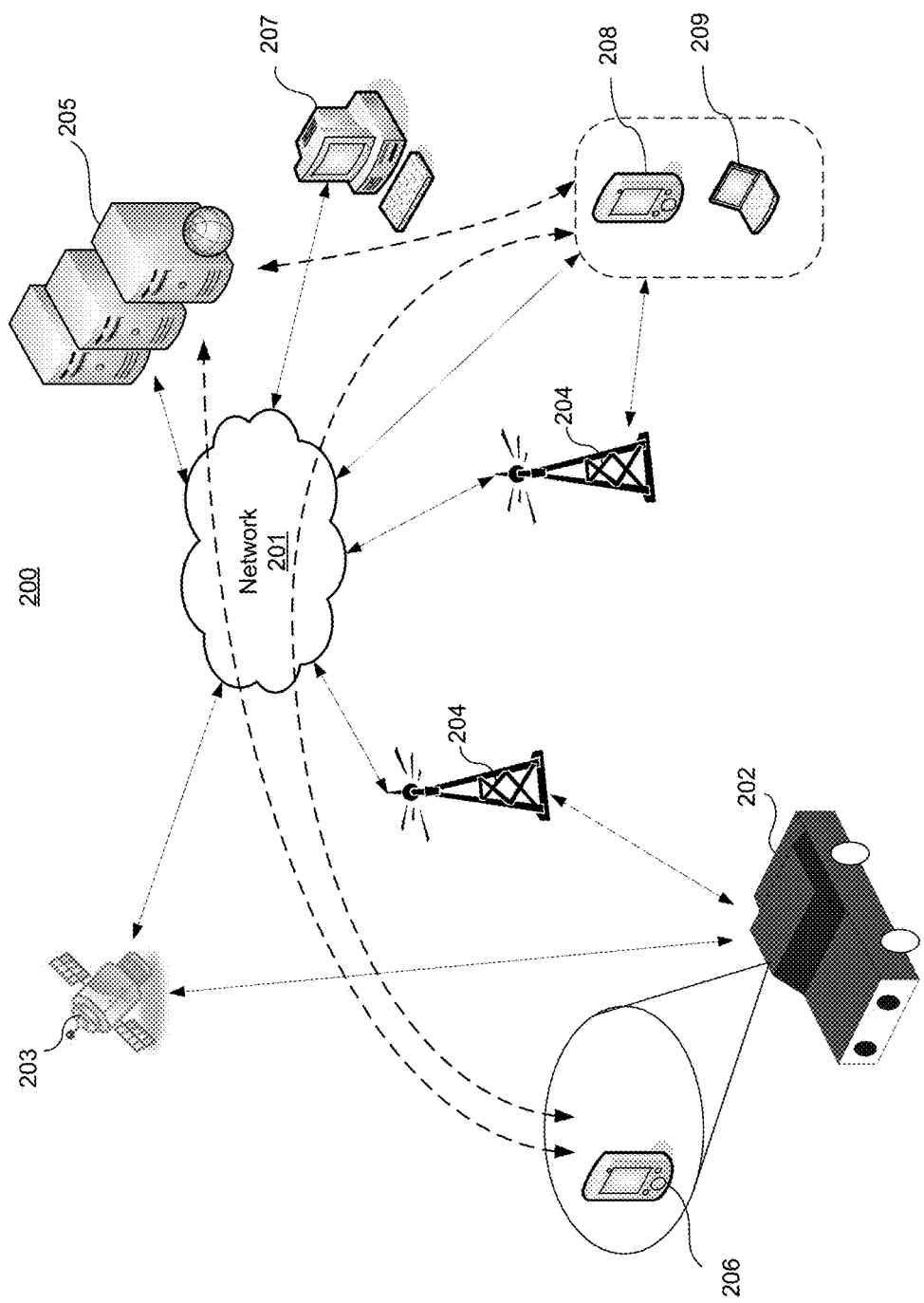
FIG. 2 illustrates an example network environment in which a system in accordance with the present disclosure may be implemented.

FIG. 2 illustrates an example network environment 200 for implementing methods according to the present disclosure. As shown in FIG. 2, the network environment 200 may include a network 201 configured to connect computing devices within or associated with a vehicle 202 (e.g., vehicle computing device 206), satellites 203, cellular network elements 204 (e.g., cell towers), one or more administrative computing devices 207, and one or more application servers 205.

The vehicle computing device 206 may be a mobile device (e.g., a smartphone, tablet, etc.), and thus, may also include various other components, such as a battery, speaker, and/or antennas (not shown). Also, the vehicle computing device 206 may attached to the vehicle (either installed by a vehicle manufacturer or as an aftermarket part) having vehicle compatible elements, such as a port for an on-board diagnostic connector or ports for other vehicle sensors (e.g., tire pressure sensors, engine temperature sensors, etc.).

The network 201 may be any type of network, like the network 131 described above, and use one or more communication protocols (e.g., protocols for the Internet (IP), Bluetooth, cellular communications, satellite communications, etc.) to connect computing devices and servers within the network environment 200 so they may send and receive communications (e.g., notifications shown as dashed arrows) between each other. In particular, the network 201 may include a cellular network and its components, such as base stations. Accordingly, for example, a vehicle computing device 206 (e.g., a smartphone or a navigation computer) of a user in vehicle 202 may communicate, via a cellular backhaul of the network 201, with an application server 205 which in turn may communicate, via the cellular backhaul of the network 201, with another computing device 208 or 209 (e.g., another smartphone or navigation computer) to provide notifications. While FIG. 2 depicts arrows pointing to the vehicle 202, it should be understood that the connections may be made with the vehicle computing device 206 within the vehicle 202. For example, the vehicle computing device 206 may communicate with a satellite 203 to obtain GPS coordinates or to transfer notifications to the network 201 through the satellite 203.

FIG. 2 illustrates only one vehicle 202. However, the social journey providing system may be configured to communicate with multiple vehicles 202 simultaneously.

Also, although FIG. 2 depicts the vehicle 202 as a car, the vehicle 202 may be any type of vehicle, including a motorcycle, bicycle, scooter, drone (or other automated device), truck, bus, boat, plane, helicopter, etc.

FIG. 2 also illustrates an example subsystem within the network environment 200. Specifically, FIG. 2 illustrates an example arrangement of computing devices that may exist within the vehicle 202 (and other vehicles not shown). To depict these computing devices, FIG. 2 includes a view of the inside of the vehicle 202. As shown in FIG. 2, the vehicle 202 may include a vehicle computing device 206.

In some embodiments, the vehicle computing device 206 may also be configured to collect drive data using, e.g., an accelerometer, GPS, gyroscope, etc. of the vehicle computing device 206. Drive data may include vehicle telematics data or any other data related to events occurring during a vehicle's trip (e.g., an impact to a part of the vehicle, a deployed airbag, etc.). For example, drive data may include location information, such as GPS coordinates, indicating the geographical location of the vehicle computing device 206 as well as speed and acceleration data that may be used to detect speeding and hard-braking events. The vehicle computing device 206 may be further configured to accept navigation inputs, such as routing information, from a user and to send routing information to the social journey providing system (e.g., application servers 205, administrative computing device 207, etc.).

Although FIG. 2 depicts just one vehicle computing device 206 within the vehicle 202, the vehicle may contain more than one vehicle computing devices 206 in some cases. For example, the vehicle 202 may carry one or more passengers in addition to the driver, and each person may have one or more vehicle computing devices 206.

The vehicle computing device 206 may communicate (see dashed arrows) to or with one or more computing devices 208 or 209. The notifications may be transmitted directly from a vehicle computing device 206 to computing device 208 or 209, or indirectly through, e.g., an application server 205 (e.g., a communication may be transmitted to an application server 205, which in turn may transmit a communication to the appropriate computing device 208 or 209). A computing device 208 may be any computing device (e.g., a smartphone, tablet, laptop, desktop computer, etc.) that is associated with another user. FIG. 2 illustrates that the computing device 208 may be a mobile computing device (e.g., a smartphone). Where the computing device 208 is a mobile computing device, it may send and receive communications through a cellular network element 204 as shown in FIG. 2. The computing device 208 may be configured in a similar manner to the computing device 101 of FIG. 1.

Still referring to FIG. 2, the vehicle computing device 206 may be configured in a similar manner to the computing device 101 of FIG. 1.

The vehicle computing device 206 may be configured to connect to one or more devices (e.g., a GPS, sensors, etc.) installed on the vehicle 202 to collect the drive data. In some embodiments, the vehicle computing device 206 may be a system including multiple devices. For example, the vehicle computing device 206 may include the vehicle's on-board diagnostic (OBD) system. The vehicle computing device 206 may be configured to interface with one or more vehicle sensors (e.g., fuel gauge, tire pressure sensors, engine temperature sensors, etc.). The vehicle computing device may be configured to communicate directly or indirectly with the vehicle telematics management system.

In some embodiments, vehicles 202 may be autonomous or in an autonomous mode (e.g., auto-pilot mode). An autonomously controlled vehicle 202 may be controlled by its vehicle computing device 206 and/or a remote computing device via the network 201 or another network. The vehicle computing device 206 may employ sensors for inputting information related to a vehicle's surroundings (e.g., distance from nearby objects) and use the inputted information to control components of the vehicle 202 to drive the vehicle 202.

FIG. 2 further illustrates that the social journey providing system may include one or more application servers 205. The application servers 205 may be configured to receive communications (which may include planned route data or information indicating driving events) from computing device 206 and process the information to determine if conditions are met (e.g., whether the user will be or is on a shared route). The application servers 205 may determine whether to forward postings to other computing devices 208 or 209. The application servers 205 may also determine which computing devices 208 or 209 should receive a notification when determining whether a posting is to be forwarded. The application servers 205 may include one or more databases for associating one or more computing devices 206, 208 or 209 with one or more users so that the user may be identified by the system.

In addition to receiving communications from computing device 206, the application servers 205 may also be configured to receive preferences and other data from the user of the computing device 206. In some embodiments, the application servers 205 may host a website that users can visit to view a history of past routes. This same website may be used by users to save and share routes to other users.

Insurance providing companies (which may own or maintain the application servers 205) may also access the application servers 205 to check the operation of a user's vehicle. In some embodiments, the application servers 205 may collect performance information related to how well users are driving. Further, the application servers 205 may include one or more databases and may maintain account information (e.g., auto-insurance policy account information) of users. The application servers 205 may also maintain an account keeping track of points and/or money awarded to users for demonstrating good driving behavior.

The administrative computing device 207 of FIG. 2 may be maintained and/or operated by an administrator of the social journey providing system. For example, in a case where the social journey providing system is provided by an insurance company, the administrator may be any personnel of the insurance company with authorization to make changes/updates to the system. System administrators may use the administrative computing device 207 to update the social journey providing system. For example, the administrative computing device 207 may be used to prepare and deploy software updates to the device program, or other software executing on devices within the system (e.g., software running on the application servers 205). The administrative computing device 207 may also be used by system administrators to ensure that the system is running smoothly. For example, the administrative computing device 207 may be used to check that computing devices 206 are sending routing data.

Figure 3:
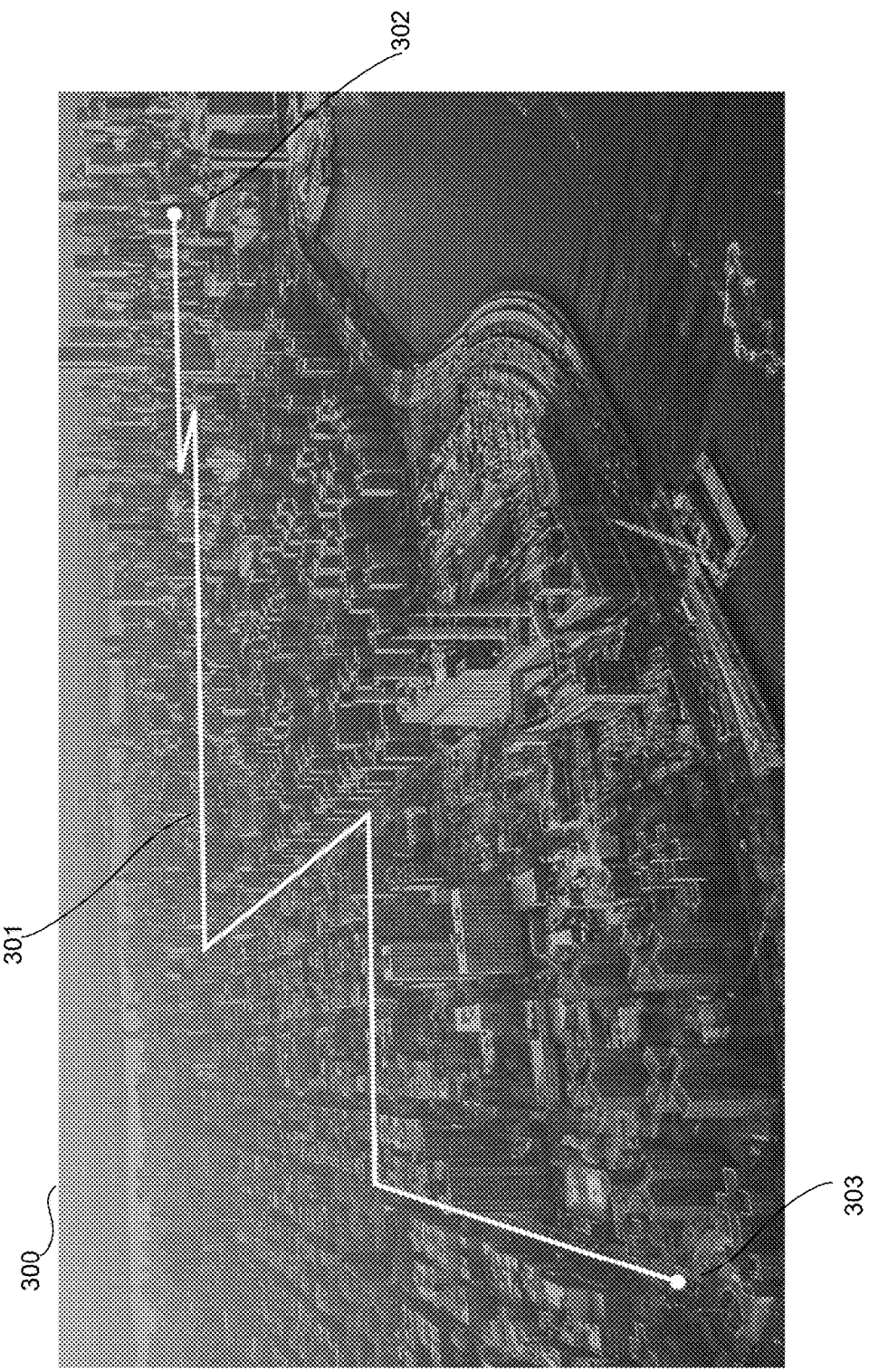
FIG. 3 illustrates a route that may be related to a particular user in accordance with aspects of the present disclosure.

FIG. 3 illustrates an example map 300 in accordance with the present disclosure. The map 300 may be accessed by a user using a vehicle computing device 206. For example, the vehicle computing device 206 may execute a program that accesses map data stored on the application server(s) 205 to provide the map 300. In some embodiments, the map data may be stored on vehicle computing device 206 and accessed internally. In addition to viewing the map 300, the user may set up a route 301. The route 301 may designate a start location 302 and a destination 303. Upon configuring a route, the computing device 206 may send the planned route to application server(s) 205 for storage and comparison with other users' routes. The route information may be provided to application server(s) 205 in various ways. For example, a set of way points may be provided by vehicle computing device 206. In some embodiments, if may be sufficient to send only the start and destination points and the application server may determine the route. In some embodiments, vehicle computing device 206 may send updates of vehicle location to application server(s) 205, at specific times or throughout a journey while on a route.

Figure 4:
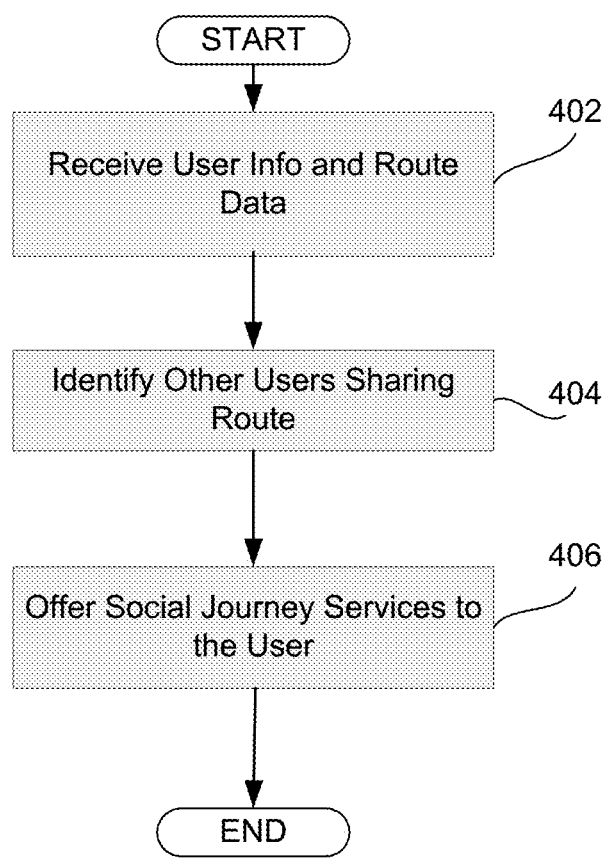
FIG. 4 illustrates a flow diagram of an example process in accordance with aspects of the present disclosure.

FIG. 4 illustrates a flow diagram for an example method in accordance with aspects of the present disclosure. At step 402, the social journey providing system, such as the system 101 of FIG. 1, may receive user information and route data. The user information may contain user identifying information, such as a user ID. The user information may also contain information such as user preference, user interests, information about user "to do" items or a shopping list. User route information may include a start location, a destination and/or a path to be taken by the user. A user may type or select their destination in an application, such as an application on vehicle computing device 206. The application may have navigation functions, but navigation functions may not be required in some embodiments. Following user entry of a destination, a route may be determined. The current location, destination and routing may be shared to a server, such as application server(s) 205. Similar information may be shared by other drivers, either at the same time or before or after the user's routing information is provided to the server. The application server(s) 205 may store a history associated with each user. In some embodiments, the application server may operate in a current window, where information form users may be stored for a short time period, and may be discarded after reaching a certain age.

At step 404, the social journey providing system may identify other users who share aspects of the user's route. There are various ways in which a shared route may be determined. In some embodiments, users having the same destination point and path may be determined to share a route. In other embodiments, users having start points and destinations in the same regional areas may be determined to share a route, for example, users going from city A to city B may be determined to share a route. In still other embodiments, users having at least a common path segment, way point or intersection may be determined to share a route. A stretch of road from A to B to C may be defined as a "linear" and may represent a common path segment for users having routes that include the linear. In some embodiments, the direction of travel may be considered in determining whether users share a route. For example, users traveling in opposite directions may be considered to be sharing a route if they share a path segment. In some embodiments, users traveling in opposite directions may be determined to not share a route, even though they may travel the same roadways.

In some embodiments, a number of routes may be configured by the system as shared route candidates and users may be monitored for their entry to one or more of the route candidates. In some embodiments, the system may provide for one or more shared routes at a given time.

In some embodiments, the system may determine that users who travel between certain zones as part of their typical behavior may share a route. For example, a user may work in one zone, zone A, and live in another zone, zone B, and the system may determine that these users share a route, based on their traveling between Zone A and Zone B, even though they may travel differing routes.

In certain embodiments, routes that may contain points that are in close proximity or destinations that are near other destinations or close to routes may be treated as shared. In still other embodiments, past or future routes may be evaluated and included in determining shared routes. In some embodiments, users may have driven on a particular segment previously and the system may determine that they share a route. Future routes may be predicted, based on user driving history (for example, when a user always takes certain routes on weekdays) or they may be detected based on data entered into a navigation device. Vehicle computing devices 206 may report location, route and destination. In some embodiments, the system may track users during all or a part of their journey.

An aspect of some embodiments may include the enabling or creating a community of users. The social journey providing system may create a community of users who share a route. The community of users may be provided access to services such as chat rooms or channels. Users may get added or dropped from the community, based on their route or their current position on a route. In some embodiments, users in proximity may be grouped together as a community. A user moving closer or farther away may be added or dropped from the community.

In some embodiments, the existence of a common interest may be considered, in addition to a shared route. Strangers may share a route and may have a common interest (finding parking, a hobby, school attended). In some embodiments the social journey system may create communities or subcommunities of users sharing a route who have a common interest.

At step 406, the social journey providing system may offer social journey services to the user. In some embodiments, the system may provide an interface for the user to submit a query to the other users identified in step 404. In some embodiments, the user may not be provided with the identity of the other users or their locations. For example, the system may provide the user with information that indicates others share a route, but the system may provide a general location of other users, rather than their precise locations. The system may identify users with a visual indication on a map while keeping the identity of those users anonymous. In some embodiments, the system may provide a chat service in which a user may communicate with the other users who share the route. In other embodiments, the system may provide for recording of a route, based on a user request, for example.

In some embodiments, the system may provide an assistance capability with which a user may request assistance from other users who share the route. The assistance capability may be further configured to provide particular assistance features, such as providing a simple method for a user to request a ride from other users sharing the route. In some embodiments, various parameters of the other users sharing the route may be considered and the request may be sent to a subset of those users sharing a route. Continuing the example above, when a user requests a ride from other users sharing a route, the system may filter the request and target the request to selected users. In some embodiments, the targeted users may be those users who are sharing the route and heading in the same direction as the user. In other embodiments, the system may target the user request to other users who have safe driving records, according to insurance risk ratings for those users.

In some embodiments, the system may provide communication capability to users in a community. Communications between users may be anonymous or the system may enable users to know the identity of other users. Communications may be in the form of text messages, audio, or other means for communication. In an example embodiment, a user may press a button and speak into the vehicle computing device 206 to send a short audio message, for example, to other users in the community. In some embodiments, a server may handle messaging between users. In some other embodiments, users may communicate peer to peer, without need for communicating through application server(s) 205.

In some other embodiments, the system may share portions or the user information with other users on the shared route. In one embodiment, the system may provide for digital bumper stickers. Digital bumper stickers are a means for users to share information about themselves, such as hobbies or interests, with other users. Users that otherwise would be strangers may be sharing a route and sharing an interest. A user may provide information about his/her interests to the system, for example, associated with the user ID. A digital bumper sticker might serve as a basis for engaging with another person. In some embodiments, the system may connect users who have the same or similar interests. In some embodiments, the digital bumper sticker may be provided to users who share a common interest on a shared route. The digital bumper sticker may be displayed to a user, as well as where the user associated with the digital bumper sticker is located. The system may point out these users somewhere down the road, for example, by displaying a representation on a user interface of vehicle computing device 206. A user who has received a digital bumper sticker may determine to engage with another user, based on information in the digital bumper sticker. In some embodiments, the system may provide a method for a user to preset their affinity or interests. In other embodiments, the system may suggest affinities, by providing affinities/interests for a user to choose from, for example, as a means to help users group together under these interests. Some of the suggested interests may be related to the driving route, such as suggesting interests related to locations along the route or related to the destination, for example. Information about a user's driving history or safety record may be considered in relation to an affinity group.

A user may configure settings to control what type of information is shared, including whether or not routes, origination, destination or personally identifiable information is shared.

In one embodiment, the system may provide services in which a user may send a query to other users that share a route, for example, to ask others about the best place for breakfast. Other users on the route may be able to answer questions. The query and response may be in real-time or queries or responses may be stored for later answering or reading. A query could be posted and then answered later by another user. In some embodiments, many users may answer a query. In those embodiments, the system may normalize the replies. In examples where a query is for a recommendation for a location or type of business, the system may provide a list of the locations ranked by highest incidence of responses or may provide locations with the highest ratings, for example, as might be determined via a voting of responses. The system may store and provide information from previous requests. A user may be able to query the system to retrieve a stored response or to check to see if a particular query had been posted before.

In embodiments where queries or responses are stored, the retrieval of the information may be further based on a geographic area or route. The system may look up, for example, using an online database, information regarding the locations that are provided in answers in order to gather additional details about a location. For example, whether or not there have been many accidents reported near the location. Queries may be limited to users that take the same route and to users that may be in proximity. Queries may be sent to users along the shared route at various locations. For example, a second user trailing behind a first user may be able to pick up a forgotten item, such as something the first user left at the office, where the office is along a shared route. Users who share a route and destination may communicate to carpool. In some embodiments, the system may provide a sample set of queries which might typically be answered by other users, as a tool for informing users of services available. For example, a query "Can I get a ride tomorrow?" may be part of a standard query set provided by the system and any user may use the query to find a ride from another user, based on destination and/or shared route.

In some embodiments, a query may be communicated to all users on a linear (a path between two points or regions), for example, to ask about bridge work or traffic, or to ask about other routes users may take or have discovered. The system may provide for an anonymous reply. Queries or query responses may be in the form of structured data, for example with fields allocated for location, merchant name, menu, hours, ratings, etc. Users may vote or add ratings and these values may be compiled by the system in order to show the top items by ranking.

In an embodiment, the system may provide for another type of communication, a posting, in which an immediate response may not be expected. A posting may be submitted by a user to other users sharing a route. A user may post a tip or review or rating, for example, "I wish I had taken exit 31." The system may use postings as a database for responses to questions. In some embodiments, users may see all messages posted within a certain proximity or radius of their location.

In one embodiment, the system may provide for virtual gifting in which a user or merchant may provide a gift to another user. For example, directions to a location to take in a great view may be provided. A little known fact could be a good gift. In some embodiments, when a user buys something from merchant on a shared route, the merchant may give the user a coupon to be offered to others sharing the route. A user may give the merchant coupon to others in his/her community. In some embodiments, a user may receive a gift he/she drives in proximity to a location. In other embodiments, a user may receive a gift because he/she had given gifts before themselves. Gifts may be provided at the end of journey, the beginning of a journey or during a journey. The system may provide a notification, such as "You received two gifts on this trip."

In some embodiments, the system may determine or predict whether a user is likely to repeat a route or trip. The system may offer gifts, such as coupons, along trips that a user often travels. In some embodiments, the system may provide gifts that are suitable to tourists. The system may provide a method for a merchant to offer coupons to users on a shared route near the merchant's place of business. The entry of a route into the vehicle computing device 206 may trigger the gifting.

In some embodiments, the system may determine or predict whether a trip is a normal trip or is a vacation, and vary the gift offers accordingly. For example, some gifts may be more attractive to tourists. A user traveling to an amusement park may be more interested in a gift suitable for a tourist while a user on their normal commute may not.

In one embodiment, the system may provide for a chat mode in which users may have a conversation, such as an audio conversation. The users in the conversation may be in proximity to one another or on a shared route. The system may provide for various channels where users may have a chat session. The channels may be designated with a topic, such as driver safety, or they may be undesignated. In some embodiments, channels may be provided for users who are driving and for users who are not the driver. Another channel may be designated for discussions about traffic. Another channel may be designated for users heading to a common event, such as a football game. The chat mode may increase driver safety by providing a service where users may talk to stay awake. The system may provide channels that are related to the route a user may be on. The system may provide a means for users on a trip create custom content. In certain embodiments, the system may provide for users to choose whether or not to communicate anonymously in the chat sessions.

In some embodiments, the system may provide for users going to and from events (e.g. concerts, games, festivals) to participate in chat sessions. The system may recognize that many users are headed to the same location. The system may provide an option for users to interact regarding the event. For example, the system may determine that 60 users are headed to a particular location and that some may be on the same route. The system may provide an indication to the users and provide a method for the users to start interacting, for example by voice or text messaging.

In some embodiments, the system may provide for route sharing and following. With route sharing, a user may develop routes and provide or publish them to other users. For example, a user may develop and publish five routes for antiquing or three routes for garage sales for the coming weekend. The system may provide for users to publish a favorite route. As described, the system may provide for a user to publish a route. In some embodiments, the system may provide for others to post alternate routes, associated with the user's published route. The system may provide for users to comment on published routes. For example, someone knowledgeable of antiquing may provide information or comments for antiquing on particular routes. Published routes may be updated by the user who posted the route.

In some embodiments, the system may provide for updates to users who want to get updates from other users ("follow" those users). For example, users may follow an expert who posts routes related to various activities or interests.

In one embodiment, the system may provide for sponsored routes. A sponsored route is a route in which a merchant or organization publishes a route. The merchant may pay to have the sponsored route published to users. For example, a Michigan wine board may sponsor routes taking users by wineries in Michigan. The route may be offered to users, based on their location or based on their entry of a route that may be near the sponsored route.

In another embodiment, the system may provide for offers, such as deals, to be input from merchants and provided to user communities, for example, based on the users' proximity and preferences in the community. In some embodiments, the system may assist merchants in determining deals to offer based on user profiles, such as a driving record. A merchant may offer exclusive deals for users on a particular route. Deals may be offered to user communities, based on routes and/or user preferences. In some embodiments, the system may provide merchants with statistics, such as how many users are driving by a location over a period of time, in order to help a merchant quantify the number of potential customers.

In one embodiment, the system may provide for user assistance. For example, a user may need assistance in getting a ride or picking up something forgotten at the office. Another user on the same route may be contacted by the system or the system may provide for a user to contact another user to request assistance. In some embodiments, the system may identify other users on a particular route and allow a user to contact them anonymously to request assistance. In some embodiments, a user's driving score or accident record or other safety related score may be considered by the system before connecting or allowing a user to provide assistance.

In one embodiment, the system may provide for coordination of rides among users. For example, the system may suggest a user to coordinate a ride with another user when the system has determined that the users travel to and from similar areas. In another embodiment, the system may identify users driving to and from a soccer practice field and offer or suggest for those users to connect with each other.

In one embodiment, the system may provide for citizen action. Often a user may notice problems along a route, long before responsible government authorities are aware of the problem. In some embodiments, the system may provide for these users to join together to start a petition for government action. For example, the system may facilitate petitioning for a bridge repair, for expansion of public transit, or for a gas station in a particular area. The system may capture and provide various metrics related to a shared route or journey. For example, the number of users on the shared route may be calculated or estimated, for example, over time. In some embodiments the results of metric calculations may be presented on a display or communicated to users, merchants, government entities, or others, for example.

In some embodiments, the system may provide a connection between users based on their social linkage, in addition to their sharing a route. Social linkage refers to an online social proximity, such as two degrees of separation on a social networking site, such as friends of a friend in an online social network. In one embodiment, the system may provide an interface to various online social networking sites in order to access information related to social links between users. For example, a social networking site may provide information that the system may use to determine social distance between users on a shared route. In addition, a user may share their contacts with the system and the system may provide algorithms in which the contacts of various users may be analyzed in order to determine social distance between users. In some embodiments, the system may connect users who share a route with another user in their contacts or with a user who may be within two degrees of separation on a social network. In some embodiments a user may ask for a blind connection to another user who may be identified as a social link, where neither party knows the identity of the other.

Figure 5:
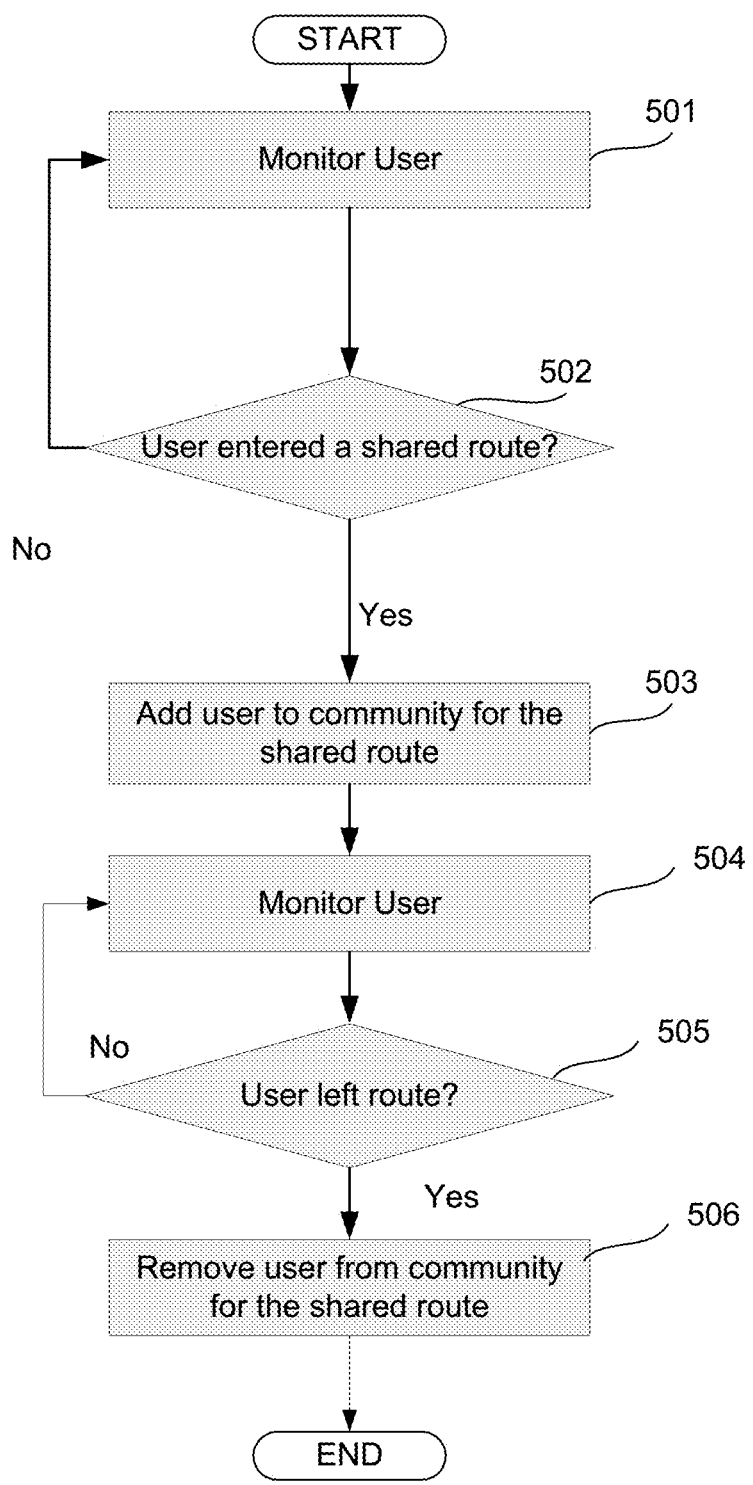
FIG. 5 illustrates a flow diagram of an example process in accordance with aspects of the present disclosure.

FIG. 5 illustrates an example process flow in which a user may be added to a community. At step 501, the system monitors a user. The system may poll the user's vehicle computing device 206 or the system may receive communications from the vehicle computing device. At step 502, it is determined whether a user has entered a shared route. In some embodiments, the user may configure a route in a navigation system, such as via an application in vehicle computing device 206 and the system may determine whether the entered route is a shared route. In other embodiments, the system may determine that a user is on a shared route based on the current location or trajectory of the vehicle computing device 206. If the system determines that the user has entered a shared route, then the process may continue at step 503. If the system determines that the user has not entered a shared route, then the process may return to step 501.

At step 503, a user may be added to a community of users related to the shared route. At step 504, the user will be monitored, similar to the monitoring in step 501. At step 505, the system checks whether the user has left the shared route. If the user has left the shared route, the process may continue to step 506, where the user may be removed from the community of users on a shared route. If it is determined that the user has not left the shared route, then the process may continue to step 504 where the user is monitored.

Figure 6:
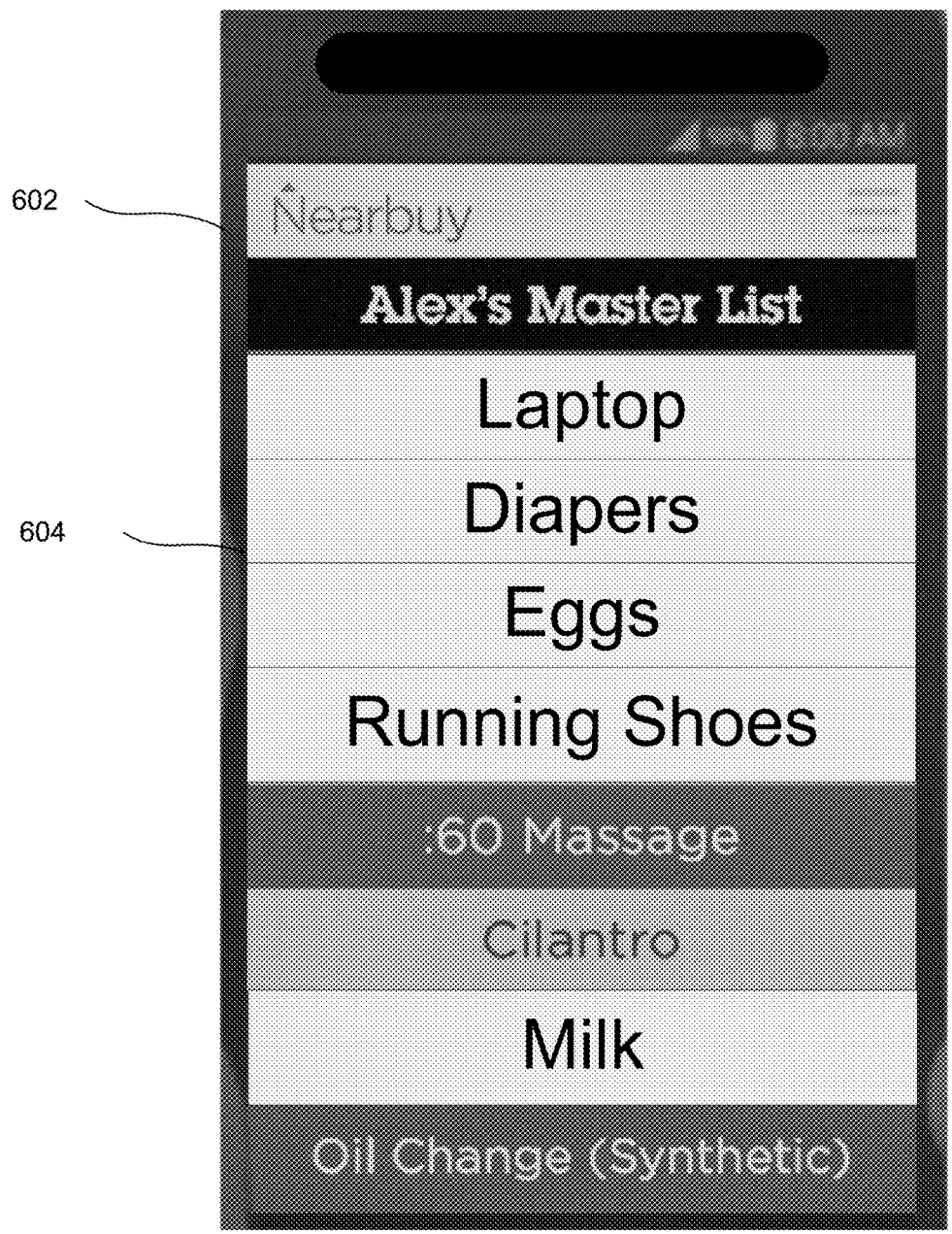
FIG. 6 illustrates an example user interface in accordance with aspects of the present disclosure.
Figure 7:
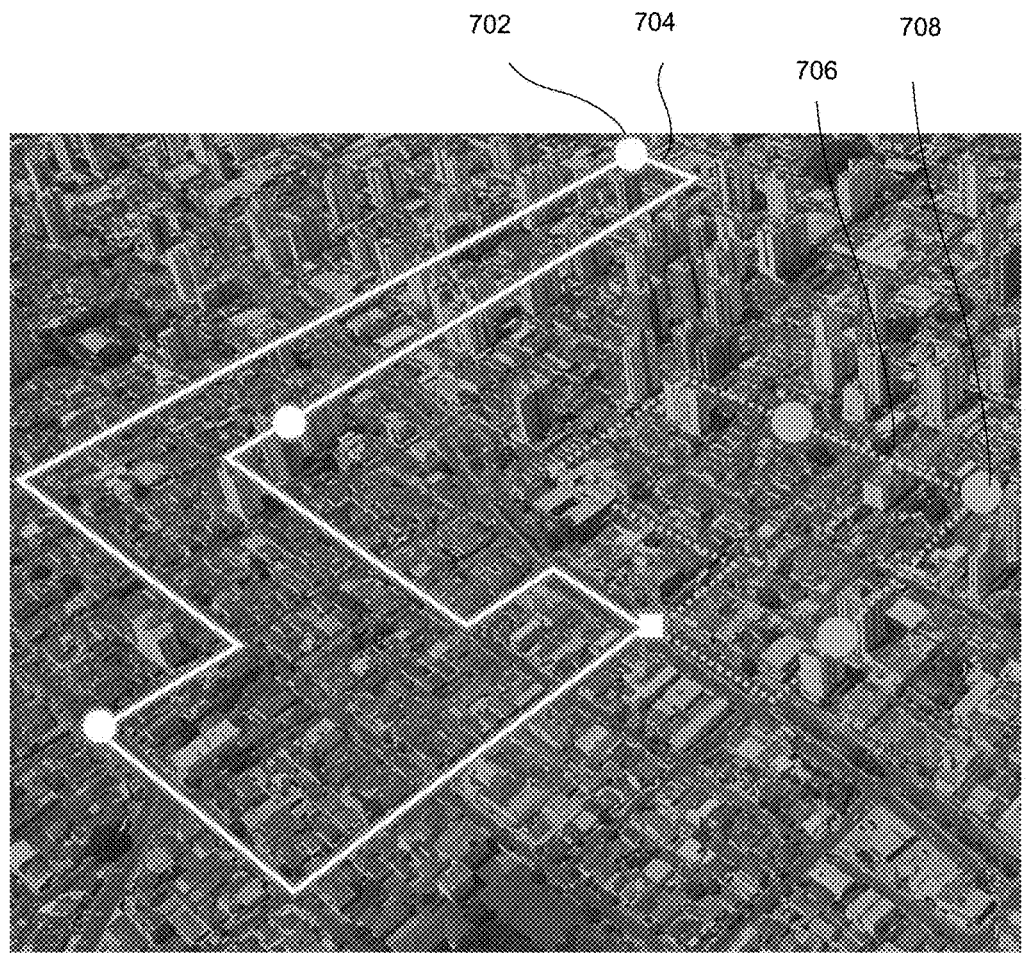
FIG. 7 illustrates an example alternate route in accordance with aspects of the present disclosure.
Figure 8:
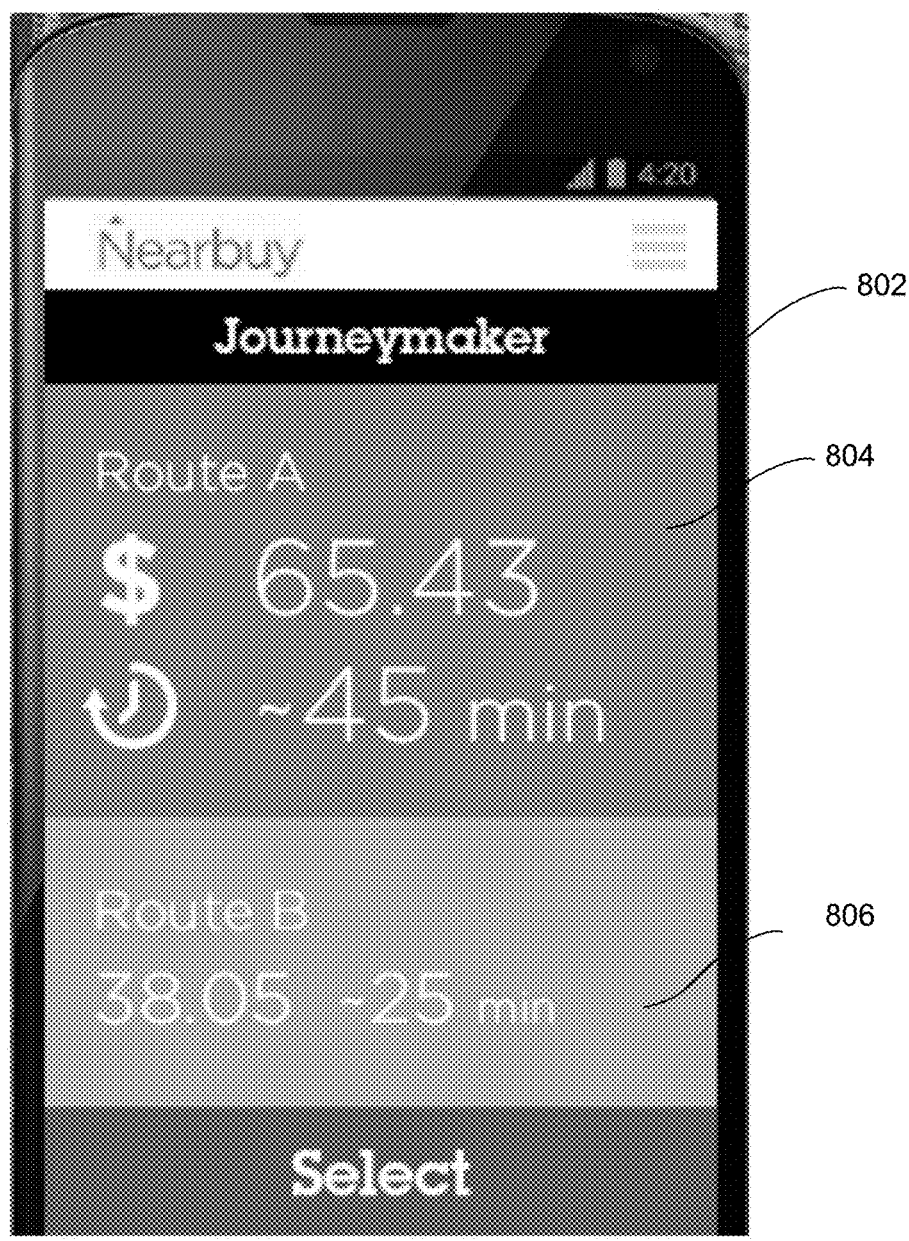
FIG. 8 illustrates an example user interface in accordance with aspects of the present disclosure.

In other embodiments, the system may provide for entry of shopping, errand or "to do" lists. FIG. 6 illustrates an example user interface for such an embodiment. User interface 602 depicts a master list in which shopping and "to do" items are both listed in a single master list 604. In some embodiments, separate lists may be used for different activities. In some embodiments, the system may provide offers to a user regarding tasks that can be accomplished, related the list, based on a user's route. The system may provide special offers to users for shopping along their route. In some embodiments, the system may provide a route, such as depicted in FIG. 7, given a particular list. Referring to FIG. 7, a route may be provided to help a user find items in a shopping list. The route may be organized for various properties, such as shortest distance, shortest time required, least number of stops required, or least cost for purchased goods. These are only some of the example properties that may be included in routing development. In some embodiments, alternate routes may be offered based on various properties in order for the user to choose a preferred routing. For example, referring to FIG. 7, route 704 may refer to route "A" while route 706 may refer to route "B". Route A may contain stops, such as stop 702. Similarly, route "B" may contain stops such as stop 708. Continuing the example, referring now to FIG. 8, information about the alternate routes 704 and 706 may be presented to the user in user interface 802. Portion 804 of the user interface may display qualities related to route "A" and another portion 806 may display qualities related to route "B". As can be seen in FIG. 8, total cost and time required for the routes may be displayed, helping a user to choose a preferred route.

Figure 9:
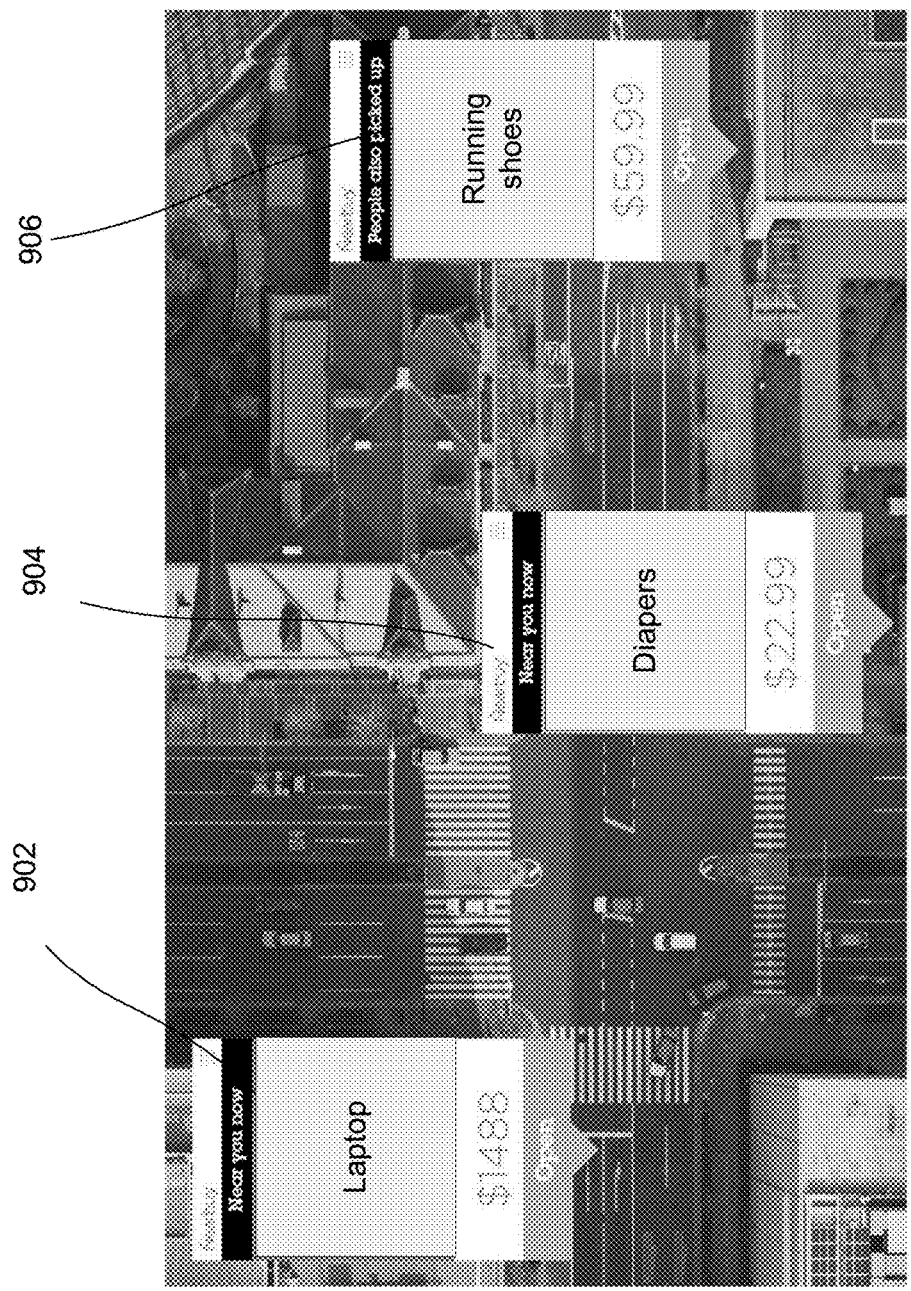
FIG. 9 illustrates an example user interface in accordance with aspects of the present disclosure.

In some embodiments, the system may combine activities or lists from more than one user, either at the request of the users or without the request of the users. The system may offer coupons or advertisements from merchants who may be related in various ways to the shopping, errand or "to do" lists. FIG. 9 is an example illustration of a user interface in which offers related to items in a user's shopping list may be presented. Items 902, 904 and 906 represent items from a user's shopping list and may be presented to the user when the user is in close proximity to merchants selling those items.

Figure 10:
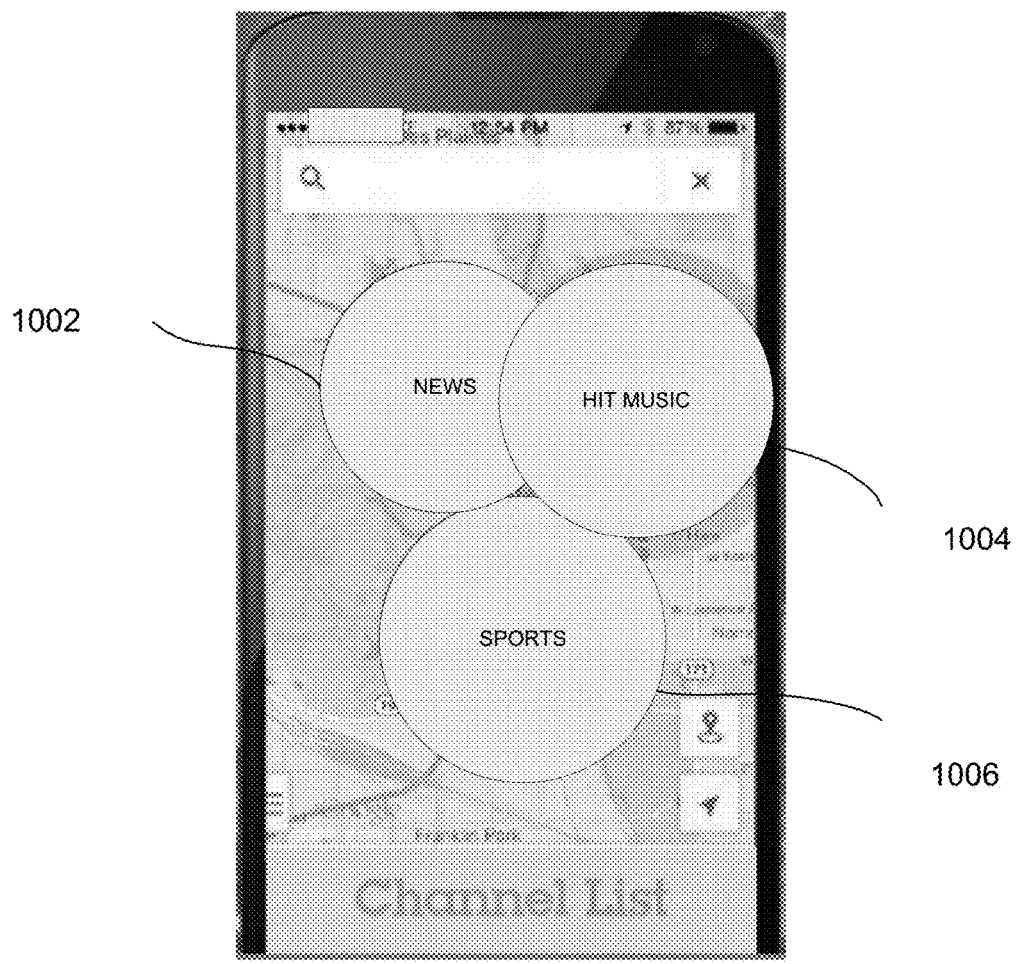
FIG. 10 illustrates a channel list in accordance with aspects of the present disclosure.

FIG. 10 illustrates an example embodiment in which the system may assign route-based or geography-based affinities to communities or to users on a route, including to users on a shared route. The system may assign route based affiliations, for example, based on geographic parameters. For example, the system may assign an affinity related to high school sports scores based on a geographic area. Continuing the example, users heading south of a city in the evening may be offered south side high school sports scores while users driving north of a city in the evening may be offered north side high school sports scores. In the example illustration in FIG. 10, users in a northwest area 1002 of the map displayed may be offered news radio programming, while users in a northeast area 1004 may be offered music hits while users in a south region 1006 may be offered sports scores. These listening affinities may be determined through various means and may be based on demographic profiles of users, insurance related scores, and other parameters.

Figure 11:
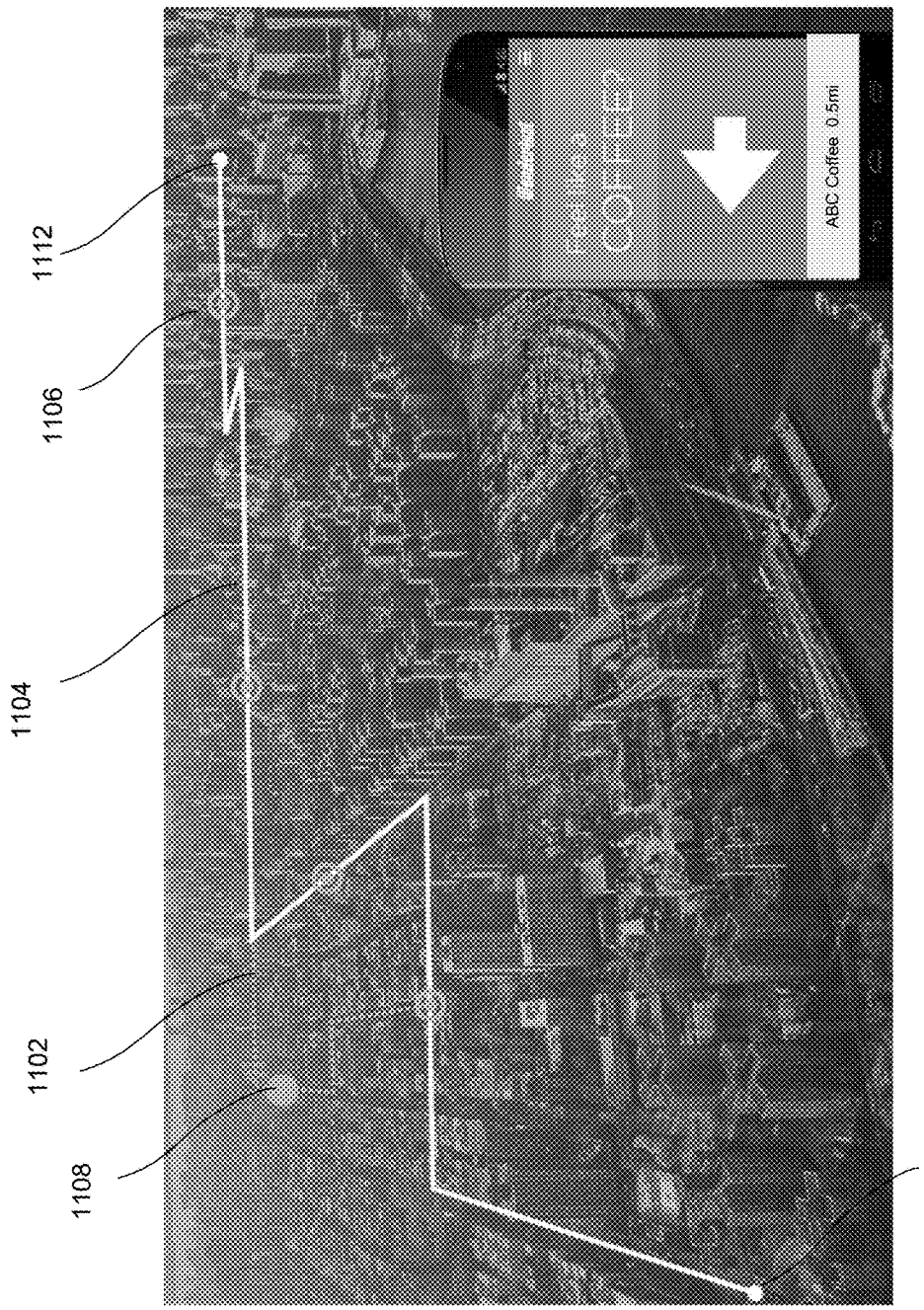
FIG. 11 illustrates an example alternate route in accordance with aspects of the present disclosure.
Figure 12:
FIG. 12 illustrates an example user interface in accordance with aspects of the present disclosure.

FIG. 11 is an example illustration of a planned route 1104 from a user's origin 1110 to his/her destination 1112. Along the route 1104 may be depicted coffee shop locations 1106, for example, in response to a user searching for coffee shops. In some embodiments, the system may offer an alternate route 1102 to a suggested coffee shop 1108, not on the originally planned route. The suggested coffee shop 1108 may be owned by a merchant who has arranged to offer coupons to a user if the user takes an alternate route to arrive at the coffee shop. An example user interface 1202 illustrating a coupon offer is shown in FIG. 12. In the example illustrated, a $2 coupon 1204 is presented to the user.

In some embodiments, a user may request a route to a destination and be offered a choice of routing types. For example, a scenic route may be one of the options available. Other routing types may include "uncharted", which may be a route the user has not taken before. Another routing type may be "random", in which the route might vary on a daily basis, for example. In some embodiments, a list of places to discover may be presented. For example, a landmark may be indicated on a display. The locations of recommended restaurants or shopping may be indicated on a display. Certain locations may be highlighted or marked in a way to convey their status as favorites of another user.

The system may incorporate various route or user safety or driving records during any of the selection or recommendation of routes, services or users discussed above. The system may provide routing with a bias toward safer routes, for example. In some embodiments, a particular merchant may be recommended, or not, based on route safety or accident claims history data nearby the merchant. In examples where a shared ride is requested, the system may control which users are informed or may respond based on the driving records of those users. Various modes may be enabled or disabled based on user driving record or history. The system may communicate with an insurance provider database or other third party or government database in order to access information about driver records, driver history, route safety, etc. In some embodiments, the system may consider aspects of risk in making recommendations. In other embodiments, the system may consider driving scores of users that have visited locations previously in order to assign a risk score to a location. In still other embodiments, the system may evaluate a user's response to information and use this response as a rating factor. For example, the system may provide information to a user about the safety of an intersection and recommend an alternate route. Continuing the example, if the user were to pass through the intersection, the system may alter a risk rating for that driver, in light of the possibly risky behavior.

In some embodiments, the system may receive information from an insured user regarding a potential route and provide the insured user with potential options for deviations from the route based on insurer preferences and insurance information related to the insurance claims in relation to potential routes. The system may also include incorporating the insured user's route decisions into insurance rating formulas and insurance premiums.

The system may provide safety information to a user or use the information to disqualify a route or destination. Various routes may be withheld from a user or not shared with others if the route is deemed to be dangerous. In some embodiments, the system may notify a user if a route is below safety qualifications. The system may record how a user chooses to use rating factor information and this may factor into a user's rating. For example, always opting for the route that is safer, or not, may be an indication of user risk tolerance. In some embodiments, the system may include a user's driver score along with a posted or shared route. In some embodiments, the system may select or screen user offers for ride sharing based on the user's driver score. For example, if a first user's driving score is 96 and a second user's driver score is 46, while each are offering a ride, the system may provide the first driver's offer and not provide the second driver's offer. The system may filter or limit functions available, depending on a user's driver score. For example, a user with a low driver score may be able to view, but not post information. In some embodiments, the system may collect data to determine the routing taken by users in relation to their driver score. For example, the system may determine that safer drivers tend to go to particular coffee shop or that users with a lower driver score tend to take particular routes. The system may use this information to score users for which a driver score is not available, for example, when a user is not a customer of a partner insurance provider. Such a user may be scored similarly to other scored users based on their having similar routing habits. In some embodiments, the system may set a particular risk threshold and filter or block route postings that are above the threshold. In still other embodiments, the system may provide information about a user's driving habits to insurance providers so that the user may, for example, get a discount on auto insurance for taking routes that are safer.

In some embodiments, the methods may include receiving a first route from a first user, receiving a second route from a second user, determining that the first route and the second route share a geographic aspect and providing a service to at least one of the first user and the second user.

In some embodiments, the methods may include accepting a query from the first user and sending the query to the second user.

In other embodiments, the methods may include creating a community comprising the first user and the second user and providing a chat service for the community.

In some embodiments, the methods may include providing a posting service wherein the first user may post messages to the community.

In some embodiments, the methods may include providing a gifting service, wherein the first user may provide a gift in a communication to the second user.

In some embodiments, the methods may include providing a set of assistance features to the first user. In some embodiments, the set of assistance features may comprise a query wherein the first user can request a ride. In some embodiments, the request may be sent to the second user, depending on a driver safety record of the second user.

In some embodiments, the methods may include publishing the first route to the second user.

In some embodiments, the methods may include determining a safety rating for the first route and publishing the first route to the second user, responsive to the safety rating being above a selected threshold.

In some embodiments, the methods may include receiving a first personal interest from the first user and providing the first personal interest to the second user. In some embodiments, the methods may include receiving a second personal interest from the second user and creating a community comprising the first user and the second user when the first personal interest and the second personal interest are related.

In some embodiments, the methods may include receiving information from a social networking service, wherein the information identifies a social connection between the first user and the second user and creating a community comprising the first user and the second user.

In some embodiments, the methods may include determining that the first route and the second route have a common destination; and providing communications between the first user and the second user.

In some embodiments, the methods may include determining that the first route and the second route have a common destination and providing a suggestion to the first user for a coordination with the second user.

In some embodiments, the methods may include determining that the first route and the second route are a shared route and identifying a merchant in proximity to the shared route. In some embodiments, the methods may include accepting an advertisement from the merchant and providing the advertisement to at least one of the first user and the second user. In some embodiments, the methods may include accepting a rating of the merchant from the first user and providing the rating to the second user. In some embodiments, the methods may include providing an identifier of the merchant to the first user. In some embodiments, the methods may include determining a route safety rating associated with a location of the merchant and providing the safety rating to the first user.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

The invention claimed is:

1. A method for reducing fuel consumption through ride sharing using a server computer communicatively coupling a first vehicle computing device, a first mobile user device, and a second mobile user device, the method comprising:

receiving, by the server computer, a first route associated with the first mobile user device, wherein the first route comprises GPS coordinates of a current location of the first mobile user device and GPS coordinates of points on a driving route of a first vehicle;

after receiving the first route, determining, by the server computer, that the first route shares at least one of: a start location, a destination location, a waypoint, an intersection, and a route segment with a stored route, wherein the stored route is a planned driving route associated with the second mobile user device;

identifying, by the server computer, that the first route associated with the first mobile user device and the stored route associated with the second mobile user device are a shared route including not matching a first route with a stored route when the driving route of the first route is in an opposite direction along the shared route than a direction of the stored route;

responsive to the identifying that the first mobile user device and the second mobile user device are associated with the shared route, selecting, by the server computer, the first vehicle for ride sharing by the second mobile user device; and transmitting, by the server computer, a notification to the second mobile user device informing a user of the second mobile user device that the first vehicle has been selected for ride sharing, wherein fuel consumed by the first vehicle by traversing the driving route associated with the first mobile user device and the stored route associated with the second mobile user device, wherein at least a portion of the driving route and stored route are the shared route, is less than total fuel consumed by the first vehicle and a second vehicle separately traversing, respectively, the first route and the stored route.

2. The method of claim 1, wherein the identifying of the shared route comprises:

matching the destination location of the stored route with a GPS coordinate point of the driving route of the first route.

3. A method for reducing fuel consumption through ride sharing using a server computer communicatively coupling a first vehicle computing device, a first mobile user device, and a second mobile user device, the method comprising:

receiving, by the server computer, a first route associated with the first mobile user device, wherein the first route comprises GPS coordinates of a current location of the first mobile user device and GPS coordinates of points on a driving route of a first vehicle;

after receiving the first route, determining, by the server computer, that the first route shares at least one of: a start location, a destination location, a waypoint, an intersection, and a route segment with a stored route, wherein the stored route is a planned driving route associated with the second mobile user device;

identifying, by the server computer, that the first route associated with the first mobile user device and the stored route associated with the second mobile user device are a shared route;

responsive to the identifying that the first mobile user device and the second mobile user device are associated with the shared route, selecting, by the server computer, the first vehicle for ride sharing by the second mobile user device;

transmitting, by the server computer, a notification to the second mobile user device informing a user of the second mobile user device that the first vehicle has been selected for ride sharing;

determining a safety rating for the first route; and transmitting the first route to the second mobile user device responsive to the safety rating being above a threshold, wherein fuel consumed by the first vehicle by traversing the driving route associated with the first mobile user device and the stored route associated with the second mobile user device, wherein at least a portion of the driving route and stored route are the shared route, is less than total fuel consumed by the first vehicle and a second vehicle separately traversing, respectively, the first route and the stored route.

4. A method for reducing fuel consumption through ride sharing using a server computer communicatively coupling a first vehicle computing device, a first mobile user device, and a second mobile user device, the method comprising:

receiving, by the server computer, a first route associated with the first mobile user device, wherein the first route comprises GPS coordinates of a current location of the first mobile user device and GPS coordinates of points on a driving route of a first vehicle;

after receiving the first route, determining, by the server computer, that the first route shares at least one of: a start location, a destination location, a waypoint, an intersection, and a route segment with a stored route, wherein the stored route is a planned driving route associated with the second mobile user device;

identifying, by the server computer, that the first route associated with the first mobile user device and the stored route associated with the second mobile user device are a shared route;

responsive to the identifying that the first mobile user device and the second mobile user device are associated with the shared route, selecting, by the server computer, the first vehicle for ride sharing by the second mobile user device;

transmitting, by the server computer, a notification to the second mobile user device informing a user of the second mobile user device that the first vehicle has been selected for ride sharing;

identifying, by the server computer, a merchant in proximity of the shared route; and transmitting at a time when the first vehicle is in proximity of the merchant, by the server computer, a notification of the merchant to the first mobile user device and the second mobile user device, wherein fuel consumed by the first vehicle by traversing the driving route associated with the first mobile user device and the stored route associated with the second mobile user device, wherein at least a portion of the driving route and stored route are the shared route, is less than total fuel consumed by the first vehicle and a second vehicle separately traversing, respectively, the first route and the stored route.

5. The method of claim 4, wherein the notification is an advertisement, and the notification causes the first mobile user device to visually display the advertisement on the first mobile user device when the first vehicle is in the proximity of the merchant on the shared route.

6. The method of claim 4, further comprising:

determining, by the server computer, a route safety rating associated with a location of the merchant; and transmitting the route safety rating to the first mobile user device.

* * * * *

UNITED STATES PATENT AND TRADEMARK OFFICE
CERTIFICATE OF CORRECTION

PATENT NO. : 10,475,143 B1
APPLICATION NO. : 15/483420
DATED : November 12, 2019
INVENTOR(S) : Hayes et al.

Page 1 of 1

It is certified that error appears in the above-identified patent and that said Letters Patent is hereby corrected as shown below:

In the Specification

Column 3, Detailed Description, Line 41:
Delete "5 Ghz" and insert --5 GHz--

In the Claims

Column 18, Line 36:
In Claim 1, after "route", insert --,--

Signed and Sealed this
First Day of December, 2020

Andrei Iancu
*Director of the United States Patent and Trademark Office*